Sept. 29, 1964 W. J. MAIRS 3,151,307
ELECTRICAL CONTACT DEVICE
Filed May 3, 1962
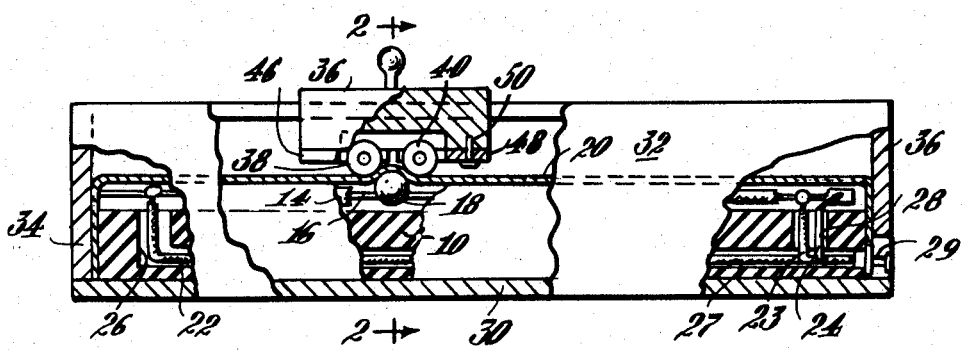
Fig. 1
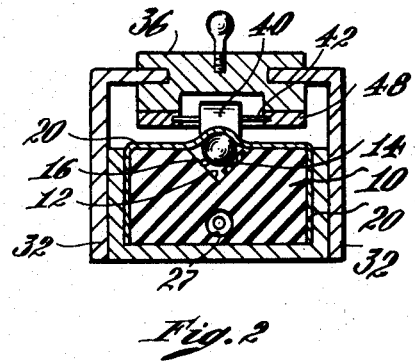
Fig. 2
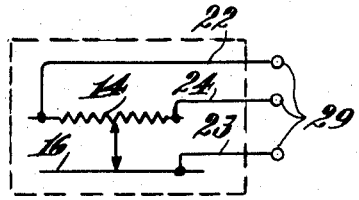
Fig. 3
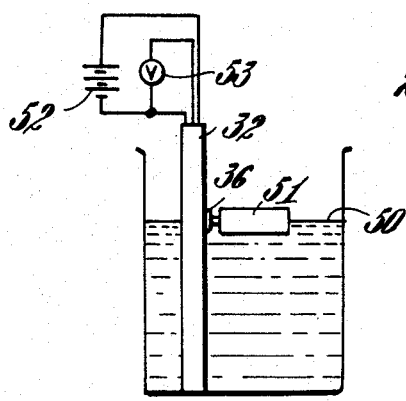
Fig. 4
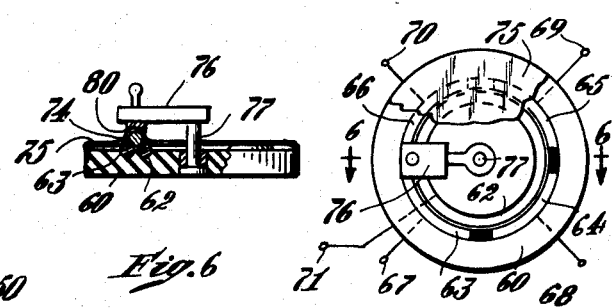
Fig. 6
Fig. 5
INVENTOR.
William J. Mairs
BY
Roberts, Cushman & Grover
ATT'YS

United States Patent Office 3,151,307
Patented Sept. 29, 1964

3,151,307
ELECTRICAL CONTACT DEVICE
William J. Mairs, 85 Canterbury Road, Waltham, Mass.
Filed May 3, 1962, Ser. No. 192,151
6 Claims. (Cl. 338—158)

This invention relates to electrical contact devices and more particularly to such devices in which the contacting elements are completely sealed from the environment of the device and in which the contact operating mechanism does not disturb this seal.

In constrructing a precision potentiometer it is highly desirable that the moving contact elements be isolated from the atmosphere so that no oxidation will form which would spoil or change the contact achieved and so that no foreign matter will accumulate on the contact elements. Further, the availability of a device whose electrical elements are completely sealed, opens new fields of use for potentiometers not previously available. An example of such a use is in the direct measurement of the depth of liquids which either are conductive or are harmful to conducting materials.

Accordingly, objects of the present invention are to provide a novel electrical contact device in which the contacting elements are sealed from the environs, in which there are no sliding or rotating seals, which is simple, accurate and extremely reliable in operation and which is of relatively simple and inexpensive manufacture.

In achieving these objects the invention contemplates an electrical contact device having a pair of elongate contact elements which parallel each other along a given, though not necessarily straight, path. A rolling, conductive bridging element electrically connects the two contact elements at corresponding points along the path. A flexible diaphragm overlies the contact and bridging elements and there is provided a constraint means, movable along the path and engaging the bridging element through the diaphragm, for confining the bridging element to a particular point along the path corresponding to the position of the constraint means.

For the purpose of illustration, a preferred embodiment of the invention is shown in the accompanying drawings in which FIG. 1 is a side view, partially in section of a potentiometer;

FIG. 2 is a section on the line 2—2 of FIG. 1;

FIG. 3 illustrates in schematic form the electrical connection of the potentiometer;

FIG. 4 illustrates diagrammatically the use of the potentiometer as a liquid depth measuring device;

FIG. 5 is a plan view, partially in section, of a rotary commutator;

FIG. 6 is a section substantially on the line 6—6 of FIG. 5.

Referring now to the drawings and particularly to FIGS. 1 and 2, an elongate base block 10 of insulating material is provided with a V-groove 12 running along the length of its upper surface. A resistance element 14 is attached to the block 12 along one side of the V-groove and a bus bar 16 is attached to the other. A conductive ball 18 lies within the groove 12 and forms a movable connection between the resistance element and the bus bar. Overlying the V-groove 12 and forming a sealed chamber therein is a flexible diaphragm 20 of a suitable low-friction insulating material such as a thin film of polytetrafluoroethylene (Teflon) or a fiberglass fabric coated with Teflon. Suitable leads 22, 23 and 24 are brought to each end of the resistance element and to the bus bar through appropriate channels 26, 27 and 28 in the block 10. The other ends of these leads terminate in sealed terminals 29.

The block assembly thus far described is appropriately secured in a base 30 which has attached thereto a pair of L-shaped side rails 32 which extend the length of the block 10. End pieces 34 and 36 cooperate with the rails 32 and 34 in enclosing and protecting the block and the block-diaphragm seal. A slide 36 running on the rails 32 carries a pair of rollers 38 and 40 whose axles 42 are journaled in plates 46 and 48 secured to the bottom of the slide by screws 50. These rollers are positioned relative to the block 10 so as to provide two points of engagement with the bridging ball through the membrane, the points of engagement being spaced along the length of the V-groove 12 and oriented so as to urge the ball against the bus bar and the resistance element and to fix its position along the groove. It is of course also possible to use a slide with non-rolling engagement points under which the diaphragm slides. Preferably such a slide is fabricated of a low friction material such as Teflon.

The operation of this apparatus is as follows: Movement of the slide is transmitted through the rollers and the diaphragm to the bridging ball. Because of the low coefficient of friction of the Teflon diaphragm the ball rolls on the resistance element and the bus bar while a sliding contact is maintained between the ball and the diaphragm itself. This desirable mode of operation can be further insured by filling the groove 12 approximately one-third full of a medium viscosity silicone grease before applying the diaphragm.

Because of the nature of the constraint exercised by the rollers the position of the ball corresponds very precisely with the position of the slide and the position of the electrical contact on the resistance element is correspondingly accurate. The electrical significance of the various mechanical elements is indicated schematically in FIG. 3, corresponding reference characters being applied thereto.

While the device illustrated has particular utility as a calibrated potentiometer for use in bridge experiments and the like, it can also be used as a displacement measuring device. Such an application is illustrated in FIG. 4 in which the potentiometer is immersed in a tank of liquid 50 and a float 51 is used to drive the slide. A fixed voltage is applied as by the battery 52 to the terminals corresponding to the ends of the resistance element and the percentage of that voltage, as measured by the voltmeter 53, appearing at the bus bar terminal is representative of the depth of fluid in the tank in relation to the total length of the resistance element. The electrically conducting components of the potentiometer are of course protected from the liquid by the diaphragm.

It will also be apparent to those skilled in the art that the principles of driving a moving contact herein disclosed are also applicable to devices involving switching or commutation and that the movement transmitted need not be limited to a straight line. For example, the same sealing method can be applied to a rotary commutator as illustrated in FIGS. 5 and 6. An insulating support 60 carries a circular, inner contact element 62 and an outer contact element which is divided into four segments 63–66. Each of the segments and the inner contact element is electrically connected to an appropriate terminal 67–70 and 71 respectively. A bridging ball 74 is provided for connecting the inner contact element 62 with a selected one of the segments 63–66. A flexible diaphragm 75 seals the contact elements and the bridging ball from the environment as in the previous example. A control arm 76, pivotally mounted on the support 60 as at 77, holds the ball 74 against the contact elements at a position corresponding to the position of the arm by means of a cup-shaped restraining element 80 which bears on the ball 74 through the diaphragm 75. Movement of the arm 76 moves the ball 74 along the track defined by the contact elements as in the previous example.

Therefore, while preferred embodiments have been described for purposes of illustration the present invention should be understood to include all modifications and equivalents falling within the scope of the appended claims.

I claim:

1. An electrical contact device comprising a support having means forming two tracks including two electrical contact elements respectively extending in parallel lengthwise of the tracks, a free electrical conductor shaped for rolling along said support bridging the tracks and electrically interconnecting said elements, a flexible diaphragm overlying said track and sealing said elements and rolling conductor off from the external environment, and control means movable on said support externally of the diaphragm and parallel to said tracks, said control means being adapted to bear against said free rolling conductor at least at two spaced points through the diaphragm so as to hold said rolling conductor bridging said tracks at a selected location on the track.

2. A contact device according to claim 1 in which one of said contact elements is a resistance element and the other contact element is a bus bar.

3. An electrical contact device comprising: an insulating base including means defining a track; a first electrical contact element extending along said track; a second electrical contact element extending along said track; a free conductive bridging element for connecting said contact elements at corresponding points along the length of the track; a flexible diaphragm for, in cooperation with said base, creating a sealed chamber around said track, said chamber containing said contact elements and said bridging element; and constraint means movable along said track and bearing against the said bridging element through said diaphragm at least at two spaced points for holding said bridging element to a particular point along said track corresponding to the position of said constraint means.

4. An electrical contact device comprising: a first elongate contact element; a second elongate contact element; insulating base means supporting said first and second contact elements in spaced paralleling relationship, said contact elements defining a path; a free, conductive bridging ball for electrically connecting said elements at corresponding points along said path; a flexible diaphragm for, in cooperation with said base means, providing a sealed chamber enclosing said contact means and said bridging ball; and constraint means movable along said path and including at least two engagement points spaced along said path and bearing against said ball through said diaphragm for, in cooperation with said contact elements, fixing the position of said bridging ball along said path in correspondence with the position of said constraint means.

5. A contact device according to claim 4 in which said first contact element is a resistance element and said second contact element is a bus bar.

6. An electrical contact device comprising: an elongate insulating base including a V-groove extending along its length; a resistance element extending along one side of the V-groove; a bus bar extending along the other side of said V-groove; a conductive bridging ball resting in said groove and engaging said resistance element and said bus bar for electrically connecting them together at corresponding points along their lengths; a flexible diaphragm overlying said V-groove and sealed around said base thereby forming a closed chamber within said V-groove, said chamber including said resistance elements, said bus bar and said ball; a pair of rails extending along the long sides of said base, a slide running on said rails; and a pair of rollers journaled in said slide and bearing against opposite sides of said ball through said diaphragm for holding said bridging ball in said groove in a position corresponding with the position of said slide.

References Cited in the file of this patent

UNITED STATES PATENTS

| 2,492,727 | Ballard | Dec. 27, 1949 |
| 2,862,088 | Mairs | Nov. 25, 1958 |
| 2,917,720 | Budd et al. | Dec. 15, 1959 |

FOREIGN PATENTS

| 813,467 | Great Britain | May 13, 1959 |